(12) United States Patent
Guillemette et al.

(10) Patent No.: US 6,447,279 B1
(45) Date of Patent: Sep. 10, 2002

(54) EXTRUSION DIE WITH ROTATING COMPONENTS

(75) Inventors: Arthur Roger Guillemette; Richard Roy Guillemette, both of West Warwick, RI (US)

(73) Assignee: Guill Tool & Engineering Co., Inc., West Warwick, RI (US)

( * ) Notice: Subject to any disclaimer, the term of this patent is extended or adjusted under 35 U.S.C. 154(b) by 0 days.

(21) Appl. No.: 09/997,104

(22) Filed: Nov. 29, 2001

Related U.S. Application Data

(63) Continuation of application No. 09/271,537, filed on Mar. 18, 1999.
(60) Provisional application No. 60/081,395, filed on Apr. 10, 1998, now abandoned.

(51) Int. Cl.7 ............................................. B29C 47/94
(52) U.S. Cl. .................... 425/107; 425/381; 425/381.2; 425/382.3; 425/466
(58) Field of Search ............................ 425/381.2, 382.3, 425/136, 154, 107, 381, 466

(56) References Cited

U.S. PATENT DOCUMENTS

| | | | | |
|---|---|---|---|---|
| 4,225,547 A | * | 9/1980 | Okita | 264/127 |
| 4,450,131 A | * | 5/1984 | Martinek | 264/108 |
| 4,575,443 A | * | 3/1986 | Moen et al. | 249/144 |
| 4,652,226 A | * | 3/1987 | Chevroulet et al. | 264/142 |
| 4,890,996 A | * | 1/1990 | Shimizu | 264/142 |
| 5,156,785 A | * | 10/1992 | Zdrahala | 82/161 |
| 5,248,305 A | * | 9/1993 | Zdrahala | 604/527 |
| 5,298,206 A | * | 3/1994 | Milliken et al. | 264/40.7 |
| 5,332,379 A | * | 7/1994 | Baumgarten | 264/259 |
| 5,667,818 A | * | 9/1997 | Guillemette | 264/173.16 |

\* cited by examiner

*Primary Examiner*—Jan H. Silbaugh
*Assistant Examiner*—Joseph S Del Sole
(74) *Attorney, Agent, or Firm*—Perman & Green, LLP

(57) ABSTRACT

The invention relates to an extrusion die assembly having a balanced flow path in which the die and tip modules cooperate to form an extended exit channel which communicates with an extrusion channel. The die is rotatably mounted on the die holder and the tip module is rotatably mounted within the axial bore. Each of the rotatably mounted components is independently driven by a motor. The motors are controlled to provide an infinite variation in relative rotational motion between the rotating components.

9 Claims, 5 Drawing Sheets

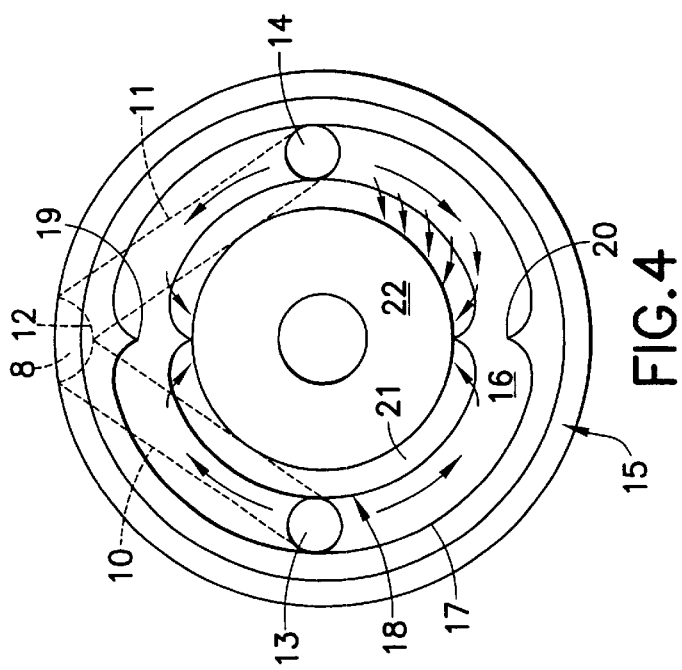
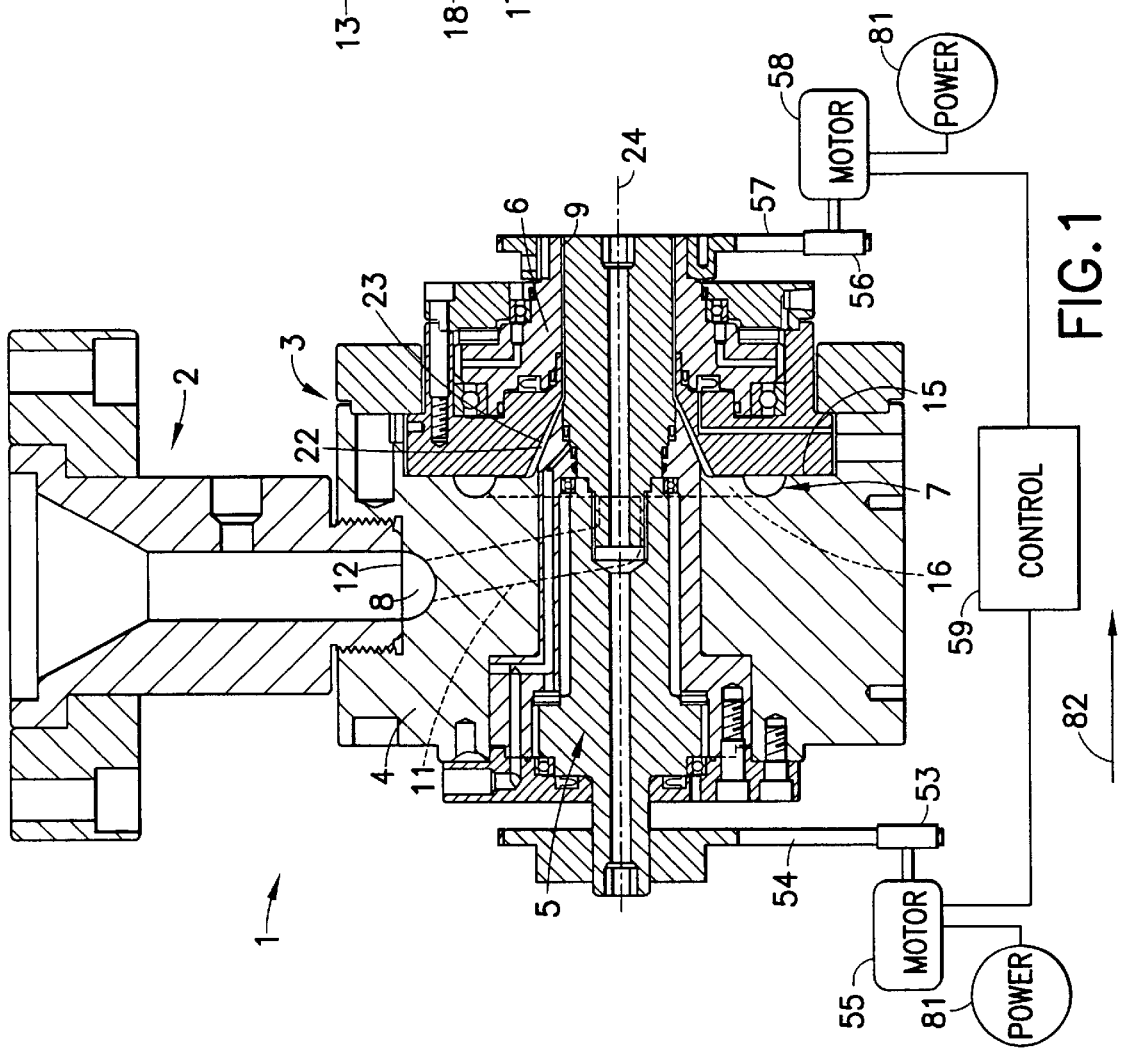

EXTRUSION DIE WITH ROTATING COMPONENTS

This is a continuation of application Ser. No. 09/271,537 filed Mar. 18, 1999 which claims the benefit of U.S. Provisional Application No. 60/081,395 filed Apr. 10, 1998 now abandoned.

BACKGROUND OF THE INVENTION

In certain applications, it is advantageous to extrude plastic tubular products which are of superior strength and rigidity. This allows the plastic tubes to be used where the need for structural support is mandated. It is the purpose of this invention to increase the strength of tubular plastic products without resorting to expensive, exotic materials, such as liquid crystal polymers. To accomplish this purpose, this invention provides an extrusion die assembly for common thermoplastic materials which provides a rotary motion to the molten plastic material as it is extruded.

Several attempts have been made, in particular in the medical field, to increase strength and rigidity by orienting the extruded material in a helical manner. Such an attempt is illustrated in U.S. Pat. No. 5,156,785 which describes a method by which catheters are constructed from a mixture of liquid crystal polymers and other plastics. Using an extrusion die with rotating components, fibrils of liquid crystal polymer are oriented in a helical pattern in order to construct catheters with greater rotational stiffness. In U.S. Pat. No. 5,248,305, which is related to the '785 patent, a schematic depiction of an extrusion head with rotating components is shown in FIG. 2. It should be noted that there is no description of how the relative rotation of the extrusion die elements is accomplished. It is a purpose of this invention to construct a reliable system for rotating the opposing surfaces which form an extrusion channel an extrusion die for use with common thermoplastic materials.

It is a purpose of this invention to provide the advantages of extrusion with rotating components for applications involving larger products made from common thermoplastic materials. As the materials become less viscous, there is an increased need to avoid the dead spots of common plastic delivery systems and provide a balanced flow. It is the purpose of this invention to combine an extrusion die assembly having a balanced flow passage with rotating die elements. A balanced flow extrusion die passage is described in U.S. Pat. No. 5,667,818, the disclosure of which is incorporated herein by reference.

SUMMARY OF THE INVENTION

An extrusion die system is constructed of an assembly of axially aligned modules which are constructed having a balanced flow passage extending through the assembly to supply flowing plastic to a conical extrusion channel. The passage ends in an extended annular exit channel formed by surfaces that rotate relative to each other. The assembly consists of a die body, a die holder, and a die which are all axially aligned and constructed with an overall axial bore formed by the cooperation of the modules. A tip module is positioned in the axial bore and itself has an axial bore to allow the passage of an elongated component which is to be coated i.e. wire. The tip module consists of upstream and down stream parts rotatably mounted in a tip holder. The die and the tip module cooperate to form an extended exit channel which communicates with the extrusion channel. The die, is rotatably mounted on the die holder and the tip portions are rotatably mounted within the axial bore by the tip holder. Each of the rotatably mounted components is independently driven by motors. The motors are controlled by a computer to provide an infinite variation in relative rotational motion between the rotating components.

A unique bearing and seal arrangement is employed for reliable rotation of the rotating surfaces which form the extended exit channel. The bearing group at the downstream end consists of a pair of spaced radial bearings and a thrust bearing mounted in between. To minimize leakage at the interfaces of the rotating surfaces,, a labyrinth type seal is constructed at the interface to create a limited tortuous path for leakage which absorbs the majority of pressure drop. The labyrinth seal is immediately followed by a face seal which accommodates the remaining pressure drop. A secondary face seal is constructed adjacent in the leakage path to the primary face seal and provides an axial force which preloads the thrust bearing. The secondary face seal also provides a backup to the primary face seal in the event of a failure. A sensing passage communicates with the chamber of the secondary face seal to allow the sensing of increased pressure to provide a warning of primary seal failure.

The bearings are situated in a closed oil bath which utilizes a high viscosity oil. The bath consists of the bearing compartments and a chamber into which fins extend. The fins are attached to a rotating component and operate to circulate oil as the components rotate.

DESCRIPTION OF THE DRAWING

The preferred embodiment of the invention is described in more detail below with reference to the drawing in which:

FIG. 1 is cross sectional view of the extrusion system of this invention;

FIG. 4 is an end view of the die body of this invention;

DESCRIPTION OF THE PREFERRED EMBODIMENT

Figure 2:
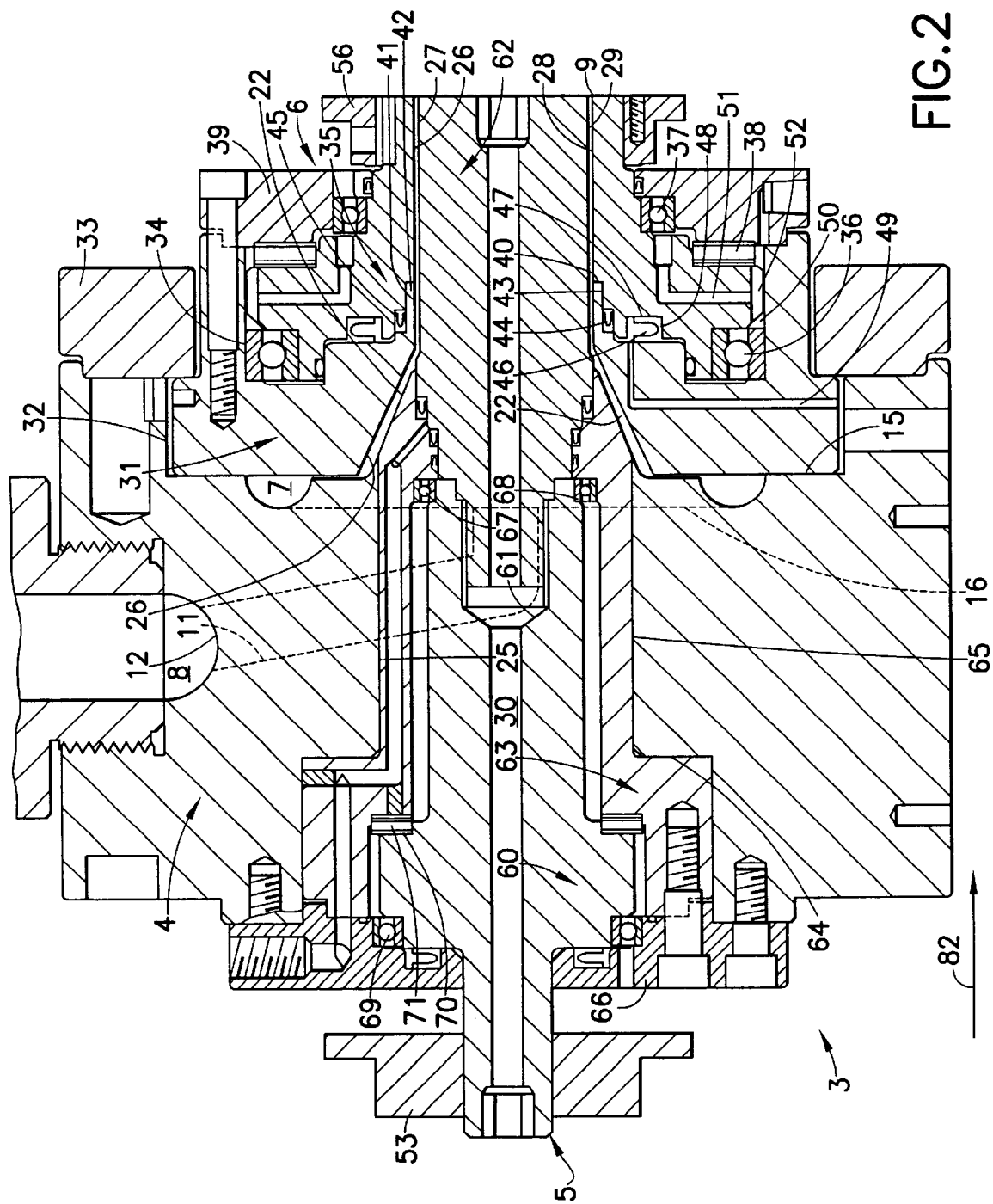
FIG. 2 is cross sectional view of an extrusion die having the balanced low passage and rotating elements of this invention.
Figure 3:
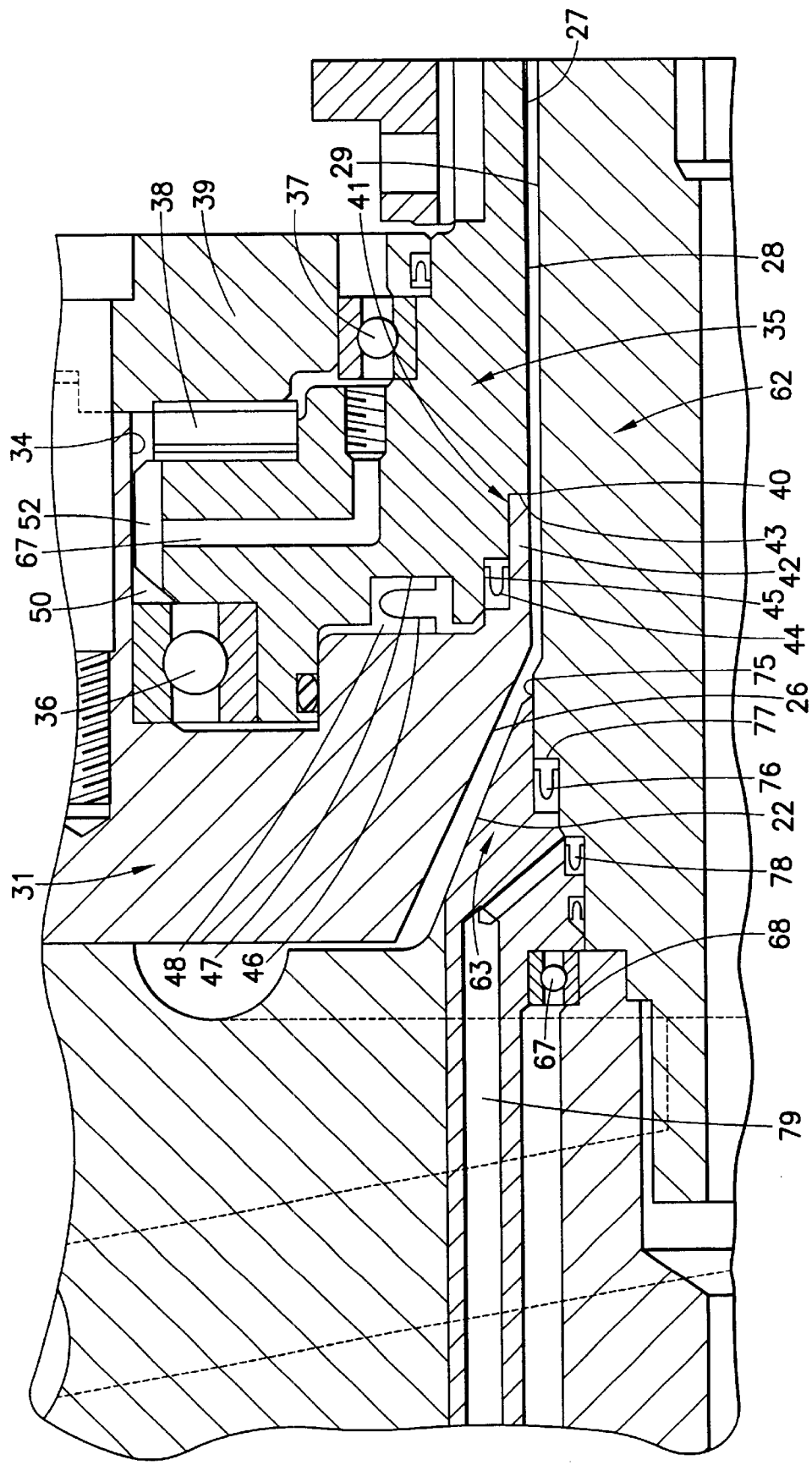
FIG. 3 is an enlarged cross sectional view of the bearing and seal system for the downstream rotating components of this invention.

The extrusion system 1, illustrating the assembly of components of this invention, is shown in FIGS. 1 through 3 and is constructed to extrude a tubular product constructed of common thermoplastic materials. The system 1 includes an extruder 2 designed to provide molten plastic to an extrusion die 3. The extrusion die 3 consists of a series of components including a die body 4, and a die module 6. For ease of reference, the invention will be,described with reference to the general axial flow of plastic from the upstream inlet to the downstream exit in the direction of arrow 82 of FIG. 2. When assembled, the extrusion die 3 of these components is constructed having a passage 7 therein extending from an upstream inlet 8 to a downstream outlet 9. The passage 7 is formed by the cooperation of adjacent components and the individual components of the passage communicate to provide a continuous passage 7 for the flow of molten plastic through the extrusion die 3. This passage is constructed to provide a balanced flow of plastic to and throughout an extrusion channel 23 which is formed downstream as described below.

The flow passage 7, as shown in FIGS. 1 and 2, includes inlet 8, which receives molten plastic from an extruder 2. Flow channels 10 and 11 are connected to inlet 8 and a divider 12 separates the incoming stream of plastic evenly into the two channels. Flow channels 10 and 11 are constructed in the die body 4 and extend through the die body 4 to outlets 13 and 14 respectively, in the transversely oriented downstream face 15 of die body 4. A distribution groove 16 is formed in the downstream face 15 between an upstream edge 17 and a downstream edge 18. The distribution groove 16 communicates with the outlets 13 and 14 to receive molten plastic from the flow. channels 10 and 11. The distribution groove 16 is substantially semicircular in cross section and extends in an annular manner concentric with the axis 24 of the extrusion die 3. As shown in FIG. 4, the flow of plastic will be around the distribution groove 16 from each of the outlets 13 and 14. The flow will be in two opposing paths within the groove 16. Positioned symmetrically in the groove 16, equidistant from the outlets 13 and 14, are a pair blending wedges 19 and 20. Blending wedges 19 and 20 are contoured to encourage the movement of plastic towards the downstream edge 18. The downstream edge 18 consists of an extended feat land 21 which merges into a conical surface 22 constructed as described below. To enhance distribution of the plastic within the distribution groove 16, the land 21 is constructed with increased width or height in the vicinity of the incoming plastic. This promotes a flow as indicated by the arrows in FIG. 4. The land 21 diminishes in width or height in each direction away from the outlets 13 and 14. The plastic will therefore be distributed evenly over the downstream edge 18 and provide an likewise balanced flow within the extrusion channel 23.

The die body 4 and die module 6 are constructed with axially extending bores 25 and 26 respectively which align to form a continuous opening along the axis 24 of the extrusion die 3. A tip module 5 is constructed to fit within the bore 25/26. A clearance is formed between the inner surface of the bore 26, and the outer surface of the tip 5 to form the extrusion channel portion 23 and the exit portion 27 of the plastic passage 7. As shown best in FIG. 2, the conical surface 22 is constructed on the outer surface of the tip module 5 and cooperates with a conical portion of the bore 26 to form the tapered extrusion channel 23. The tip 5 may be constructed with an axial bore 30 to allow an elongated element to pass through the die for coating. The extended exit 27 is formed by the cooperation of surface 28 on die module 6 and surface 29 of the tip module 5.

It is desired, in accordance with this invention, to provide relative rotational movement between the surfaces 28 and 29. Before discussing the mechanical details of this function, it is necessary to describe the environment to which these moving parts are exposed. First the molten plastic is a significant source of heat and may cause the rotating components to obtain a temperature of up to 450° F. In addition the extruder 2 supplies the plastic at a substantial pressure which will rise as the plastic is forced through the extrusion die 3. The rotating components will experience pressure in excess of 5000 psi. To maintain the rotational capability of the extrusion die 3 under these conditions is not a simple matter. The uneven expansion of the parts may cause the parts to bind and stall the rotation. The pressures will promote leakage at every opportunity. In order to accomplish the rotational function, a unique bearing and seal system is constructed. This support system is described below.

As best shown in FIG. 3, the die module 6 consists of a die holder 31 which is assembled within recess 32 in die body 4 and held in place by a collar 33. The collar 33 may be bolted to die body 4. A die holder recess 34 is formed in the downstream face of the die holder 31 and is shaped to receive the die element 35. The die holder 31 is constructed with an axial conical bore which forms a portion of the bore 25/26. Inner surface 28 of the conical bore 26 mates with surface 22 of the tip module 5 to form the extrusion channel 23. The die holder 31 is fixed within the recess 32.

Figure 6:
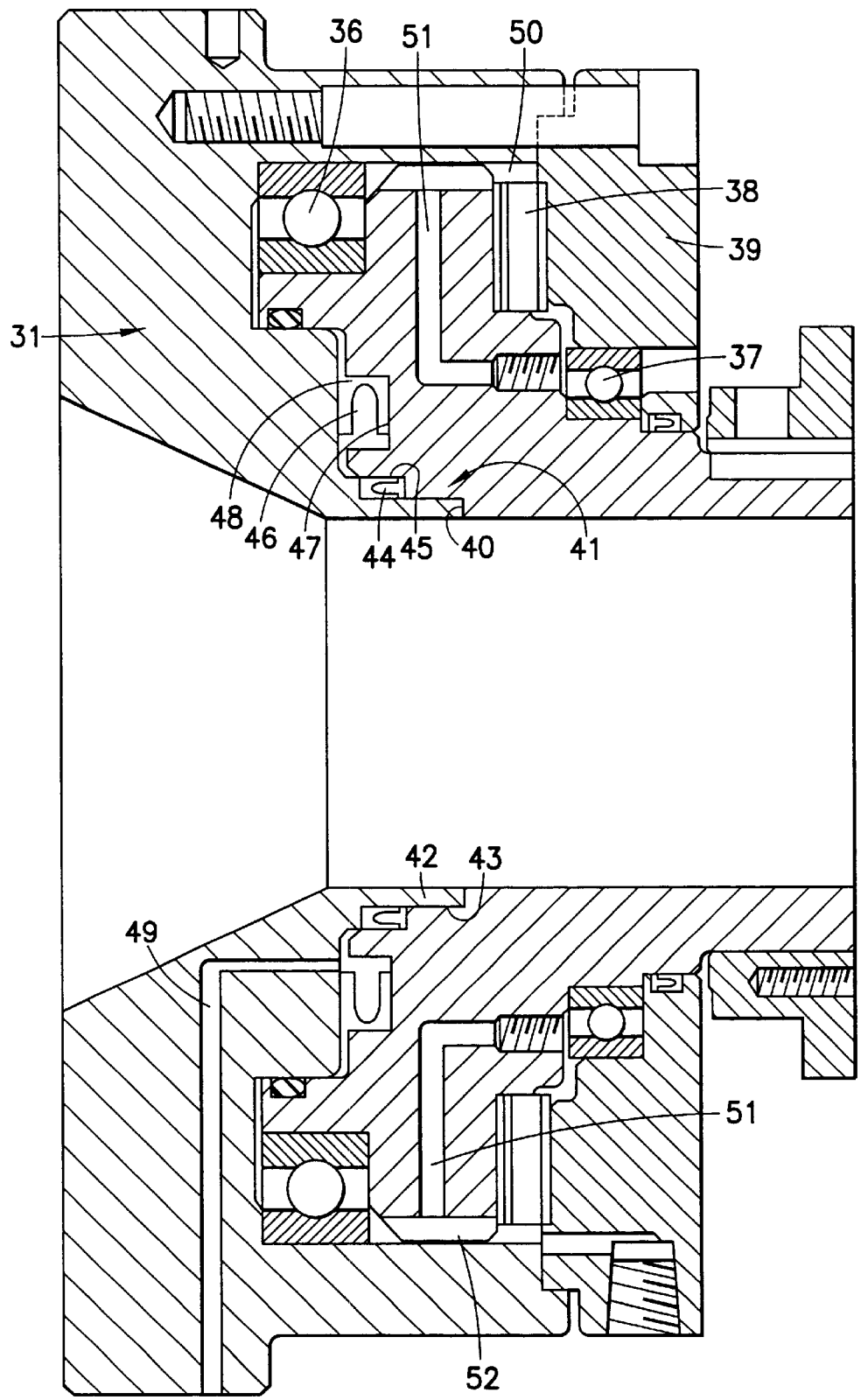
FIG. 6 is a cross section of the extrusion system of this invention showing the die bearings and seals.

Die element 35 is mounted for rotation within the recess 34 of die holder 31. As best shown in FIG. 6, in order insure reliable rotation, the die 35 is mounted on a pair of radial bearings including upstream bearing 36 and downstream bearing 37. Because of the need to continuously operate the die system 1 with the rotating components under substantial pressure, a thrust bearing 38 is used to control thrust loads. The die element 35 and its associated bearings are held in the assembled position by a collar 39 which may be bolted to the die older 31. Although it would be possible to mount the die element 35 directly to the die body 4, it is preferable to use the die holder 31 to facilitate repairs, component replacement, or the use of alternative size or shape dies.

The rotational mounting of the die element 35, creates an undesirable leakage path for the plastic at the interface 40 between the die element 35 and the die holder 31 which is best shown in FIG. 6. Because of the high pressure this leakage path will require a unique seal configuration. The primary seal 41 absorbs the majority of the pressure drop required and consists of a labyrinth type arrangement utilizing the steel to steel interface 40. The seal 41 consists of an annular shelf 42, formed at the interface of die holder 31, which mates with an oppositely shaped recess 43, machined into the interface of die element 35. It has been found that, the combination of the perpendicular turn created by the shelf 42 and the use of close tolerances, provides an effective primary seal for the pressures involved. A slight clearance is provided in the seal 41 to allow the plastic to infiltrate and such infiltrated plastic provides a bearing surface for the rotating parts.

The remaining pressure drop may then be absorbed by the annular face seal 44. The face seal 44 is mounted in a space created upon the engagement of the die 35 and holder 31 by the annular flat 45 machined on the interface 40 of die 35. In this manner an effective primary seal is created by the cooperation of the labyrinth seal 41 and the face seal 44.

A back up face seal 46 is also inserted at the interface 40. The seal 46 is positioned to bias the die 35 in the axially downstream direction. This bias serves to provide the necessary preload force for the proper operation of the thrust bearing 38. The secondary seal compartment 48 is constructed by the machining of a rectangular shaped annular groove 47 in the interface 40 of the die 35. Compartment 48 provides an overflow reservoir in the event of a failure of the primary seals. A sensing passage 49 (see FIG. 2) is drilled into the die holder 31 to communicate with an appropriate pressure sensor (not shown) external to the die 3 to provide a warning in the event of a pressure build up in the secondary seal compartment 48. Excessive pressure in the compartment 48 could trigger an audible alarm or signal the extrusion system to shut down. The seal and bearing system for the rotating die element 35, therefore, provides an interactive assembly of parts.

The bearings are contained within a closed lubrication bath which includes the annular chamber 50. A high viscosity oil is, used to withstand the high temperatures and circulates within the bath through the oil passage 51 and chamber 50. A series of fins 52 are constructed on a circumferential face of the die element 5 extending into the annular chamber 50. Oil which falls by gravity to the lower portion of the chamber 50 can be circulated by the wiping action of the fins 52 within the chamber 50 as the die 35 rotates. As a further design concession to the high temperatures and pressures, the bearings and bearing races used in the system are coated with a material such as DICRONITE to form a durable operating surface.

The tip or pin module 5 consists of an assembly of three parts to Facilitate the repair, replacement or overhaul of the components. An upstream tip portion 60 is constructed with a central bore 30. The bore 30 of the tip portion 60 expands into a threaded recess 61 at its downstream end to receive the downstream,tip portion 62. Downstream tip portion 62 is axially aligned with the portion 60 and threads into the recess 61. Tip portion 62 is also constructed with an axial bore to form a continuation of the axial bore 30. Tip portions 60 and 62 are mounted for rotation within tip holder 63. Tip holder 63 is bolted within upstream facing recess 64 constructed in the die body 4. Tip holder 63 has a conical surface 22 which mates with the conical surface of the bore 26 in the die holder 31 to form the extrusion channel 23. The downstream section 29 of outer surface 65 of the downstream tip portion 62 is sized to provide a clearance with the corresponding surface of the die element 35. In this manner an extended cylindrical exit channel 27 is constructed communicating with the extrusion channel 23. As previously described, the channels communicate to provide a plastic flow passage 7 consisting of inlet 8, supply channels 10 and 11, distribution groove 16, extrusion channel 23, and exit channel 27. It is the surfaces 28 and 29, forming the exit channel 27 that are rotated relative to each other in accordance with this invention. Tip module 5 is held in place by end plate 66 which may be bolted to the die body 4.

Figure 5:
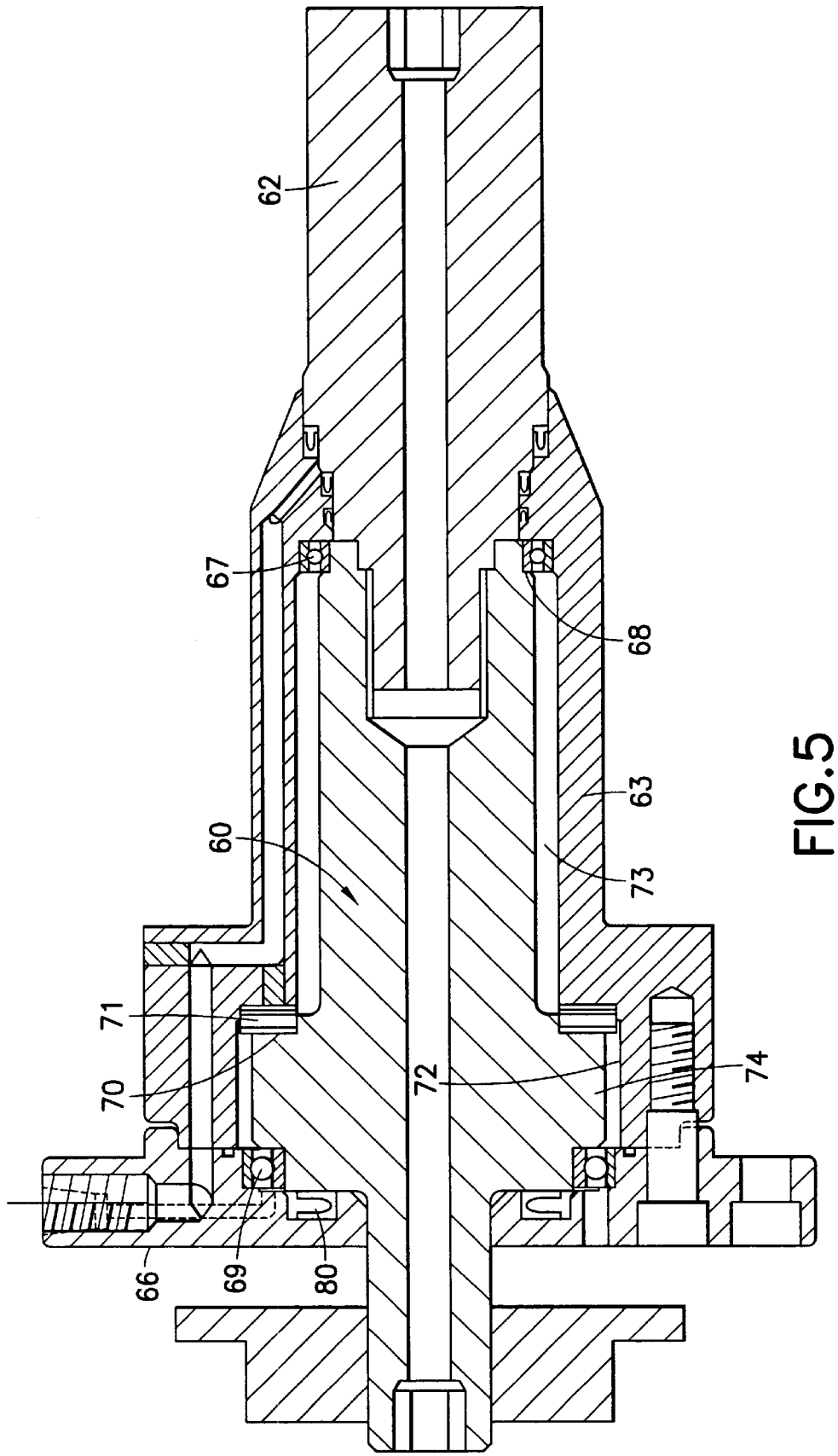
FIG. 5 is a cross section of the extrusion system of this invention showing the tip bearings and seals.

As best shown in FIG. 5, to mount the tip portions 60 and 62 for rotation within the tip holder 63, a configuration of bearings is provided which interact in a manner similar to the bearings 36, 37, and 38 of die module 6. A ring shaped radial bearing 67 is mounted in a cylindrical step 68 on the upstream end of tip portion 60. A second radial bearing 69 is mounted similarly at the downstream end of the tip portion 60. In an intermediate location, a downstream facing step 70 is machined into tip portion 60 to accommodate a thrust bearing 71. The thrust bearing 71 will respond to axial forces exerted on the tip portions 60/62. The bearings of the tip module 5 are contained in a closed oil bath consisting of a chamber 72 and annular passages 73. There is a requirement that the bearings be provided with a continuous flow of oil, however, with the pressures involved, the oil will tend to migrate away from the bearings. To counteract this, fins 74 are constructed on the outer surface of tip portion 60 and extend into the chamber 72. Again the wiping action of the fins 74 will circulate the high viscosity oil within the closed bath of the tip module 5.

A second leakage path is created at the interface 75 of the rotating components of the tip module 5. A primary seal is accomplished at the interface 75 by the face seal 76 installed on a cylindrical step 77 machined in the outer surface 65 of the downstream tip portion 62. A backup seal 78 is installed upstream of primary seal 76 on another cylindrical step. A sensing passage 79 is constructed in the tip holder 63 to enable an external sensor to sense the pressure at the backup seal 78. This will provide a signal in the event of a failure of the primary seal 76. At the upstream end of the upstream tip portion 60, another face seal 80 is installed and is held in place by the end plate 66. The face seal action against the end plate 66 will preload the thrust bearing 71. Again the seal system is designed to allow some leakage of material to infiltrate and provide a partial bearing surface for the tip module 5.

As shown in FIG. 1, The rotating parts of the extrusion die system 1 of this invention consist of the tip portions 60 and 62 and the die element 35. The tip portion 60 is operatively connected by a gear or pulley 53 through a belt 54 to a motor 55 which will impart rotary motion to the tip portions 60/62. Similarly the die element 35 is operatively connected through a gear or pulley 56, through a chain or belt 57 to a motor 58 which will impart rotary motion to the die element 35. The motors 55 and 58 are connected to an appropriate source of power 81.

The relative rotation of the surfaces applies a shear force to the material being processed and orients the material spirally about its axis. This results in increased strength and rigidity. The balanced flow insures a uniform product without any defects.

A computer 59 control both motors 55 and 58 and is programmable to allow a wide variety of relative motions between the rotating surfaces 28 and 29. Under certain circumstances, it may be advantageous to limit the rotation to a periodic or alternating clockwise and counter clockwise motion through part of a complete rotation. The control system includes appropriate sensors to feed back actual rotational speed which can be compared with a predetermined rotational speed. In this manner the rotation or angular motion of the rotating surfaces 28 and 29 may be controlled independently. The computer 59 will also receive alarm signals generated by the pressure sensors to take appropriate steps in the event of excessive pressures in the leakage paths. As a further safety measure, the operating temperature of the die body 4 is monitored by the means of a thermocouple or other suitable sensor. To avoid damage to the rotating mechanisms, the computer will disable the rotational drive system until the die body 4 is up to a predetermined operating temperature. This insures that no solidified plastic residue will be present to bind the rotating parts as the drive motors are engaged.

The extrusion die assembly of this invention is subjected to considerable heat from the molten plastic and friction exerted by the rotating components. In addition the assembly includes auxiliary heat, such as cartridge heaters or fluid circulating heaters (not shown) to maintain the plastic material at a molten temperature. This heat causes problems for the bearings on which the rotating die element 35 and tip portions 60/62 are supported. The differing coefficient of expansion of the bearing material may cause the bearings to expand and bind the rotating modules. The bearings are carefully selected and coated for temperature durability as are the seals. The supporting system for the rotating parts of this invention provide a heat resistance through the use of a highly viscous oil in an enclosed bath. The bath being constructed with internal circulating means insures a continuous supply of oil. The seal arrangement effectively eliminates leakage in spite of the adverse environment and works to provide preload forces to the bearings, while allowing the sensing of seal failures at critical points. The overall mechanism of this inventions therefore, provides an effective means by which rotation of the die elements can be accomplished.

We claim:

1. An extrusion die assembly comprising a die body, a die element and a tip member which cooperate to form a passage for extruding plastic, wherein at least one of said die element and tip member is rotatably mounted on the die body, said at least one rotatable mounted element or member forming an interface with the die body, said assembly including an apparatus for supporting said at least one rotatably mounted element or member on said die body, said apparatus comprising:

a closed oil bath including multiple bearing compartments and a chamber having oil contained therein, said chamber extending in a substantially annular configuration at the periphery of the die element or tip member, and said chamber having means, mounted on the die element or tip member for circulating the oil within said bath; and a combination of radial and thrust bearings mounted in said bearing compartments to support said die element or tip member for rotation.

2. The extrusion die assembly according to claim 1, wherein said combination of radial and thrust bearings further comprises:

a first radial bearing mounted in a compartment constructed at said interface;

a second radial bearing mounted in a compartment constructed at said interface, said second bearing axially spaced from said first bearing; and a thrust bearing mounted in a compartment constructed at said interface, said thrust bearing being positioned axially intermediate of said first and second radial bearings.

3. The extrusion die assembly according to claim 1, wherein the means for circulating the oil in the chamber includes fins, constructed on said at least one rotatably mounted element or member and extending into the chamber.

4. An extrusion die assembly comprising a die body, a die element and a tip member which cooperate to form a passage for extruding plastic, wherein at least one of said die element and tip member is rotatably mounted on the die body, said at least one rotatably mounted element or member forming an interface with the die body, said assembly including an apparatus for sealing said interface said apparatus comprising:

a primary seal constructed in said interface at its juncture with said passage, said primary seal comprising, at least, first and second sealing surfaces extending away from said juncture to form a tortuous path in said interface; said primary seal further comprising a face seal positioned in a chamber constructed in said interface displaced further away from said juncture than said tortuous path to provide a back up seal to the tortuous path.

5. The extrusion die assembly according to claim 4, wherein said sealing- apparatus further comprises:

a secondary face seal positioned in a secondary chamber constructed in said interface displaced further away from said juncture than said primary seal to provide a back up seal to the primary seal and wherein the secondary chamber communicates with a sensing passage to indicate leakage into said secondary chamber.

6. The extrusion die assembly according to claim 4, wherein said tortuous path is formed by opposing surfaces at said interface, said opposing surfaces extending radially from said juncture a first distance and continuing axially a second distance to form a corner in said interface.

7. The extrusion die assembly according to claim 6, wherein said first distance is shorter than said second distance.

8. The extrusion die assembly according to claim 5, further wherein a sensor is positioned in said sensing passage to generate a signal relative to the pressure in said secondary chamber.

9. The extrusion die assembly according to claim 8, wherein said at least one rotatably mounted element or member is driven by a computer controlled motor and said pressure signal is received by the computer to initiate a control command in response thereto.

* * * * *